INVENTOR
Eric W. Scarpa
By Watson, Cole, Grindle, Watson
ATTORNEYS

Sept. 29, 1964　　　　E. W. SCARPA　　　　3,150,614
APPARATUS FOR THE MANUFACTURE OF WAFER SANDWICHES
Filed May 24, 1963　　　　　　　　　　　　　　4 Sheets-Sheet 2

INVENTOR
Eric W. Scarpa
By Watson, Cole, Grindle & Watson
ATTORNEYS

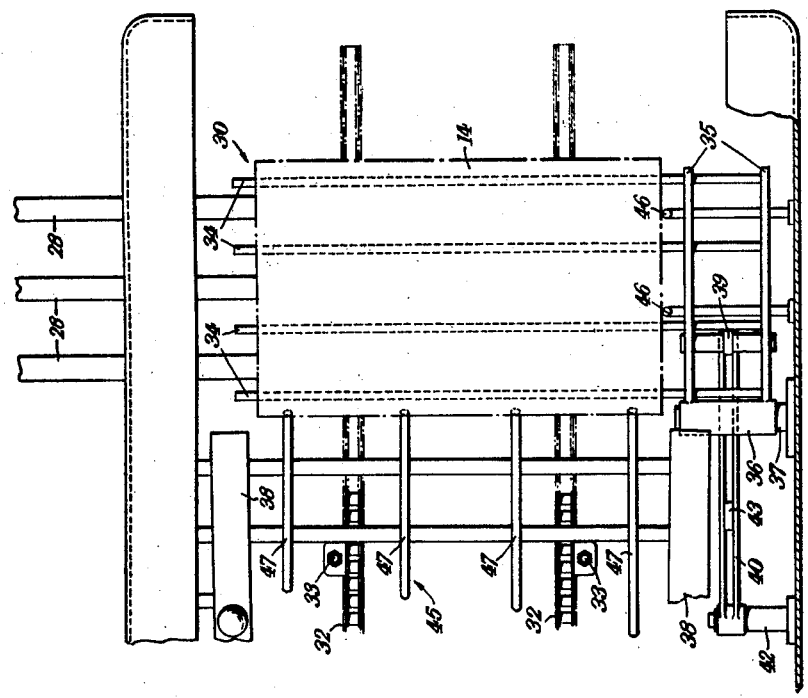
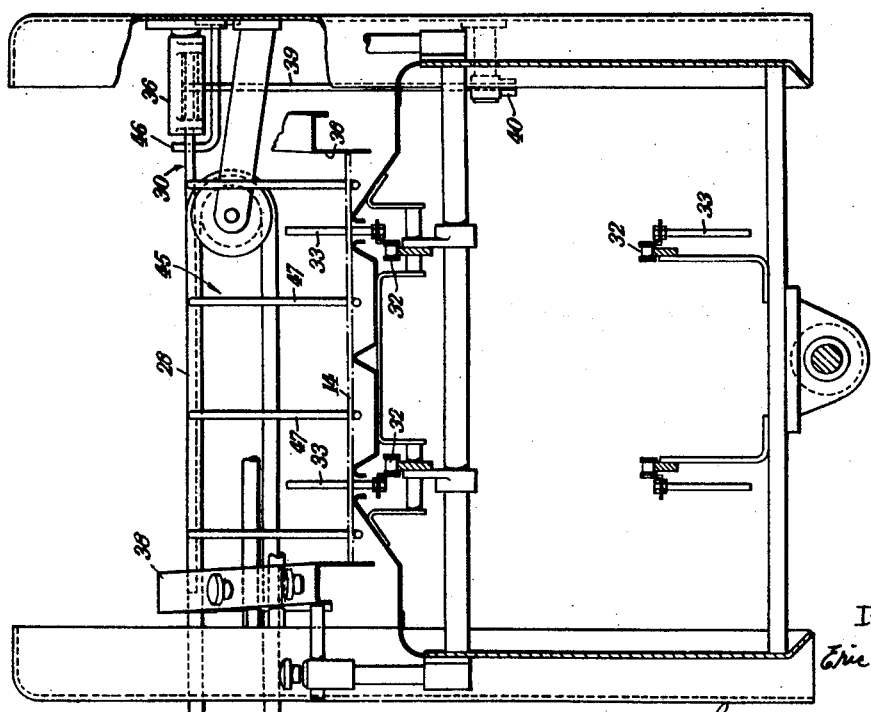

United States Patent Office 3,150,614
Patented Sept. 29, 1964

3,150,614
APPARATUS FOR THE MANUFACTURE OF WAFER SANDWICHES
Eric Walter Scarpa, Peterborough, England, assignor to Baker Perkins Inc., Saginaw, Mich., a corporation of New York
Filed May 24, 1963, Ser. No. 283,038
Claims priority, application Great Britain June 4, 1962
5 Claims. (Cl. 107—1)

This invention provides an apparatus for the manufacture of wafer sandwiches comprising a plurality of wafer baking ovens, a corresponding number of conveyor systems which carry wafers in parallel paths away from the ovens, creamers associated with all but one of the conveyor systems, those of the conveyor systems which have creamers traversing the wafers in abutting relation beneath the creamers, sheet depositors at the ends of all the conveyor systems to which wafers are delivered in the same predetermined spaced relation by all the conveyor systems, and a flight conveyor extending at right angles to all of the conveyor systems beneath the depositors, all depositors except the last one passed by the flight conveyor depositing creamed wafers in succession on the flight conveyor to form thereon piles of superposed creamed wafers and the last depositor depositing a dry wafer on top of each such pile.

The apparatus thus forms sandwiches containing wafers equal in number to the baking ovens and the number of wafers in the sandwiches can be varied by shutting down one or more of the ovens and associated conveyor systems.

Preferably each depositor includes a grid, a chute and means operating in timed relation with the flight conveyor for periodically tilting the grid to allow a wafer to slide down the chute and on to the flight conveyor.

Figure 1:
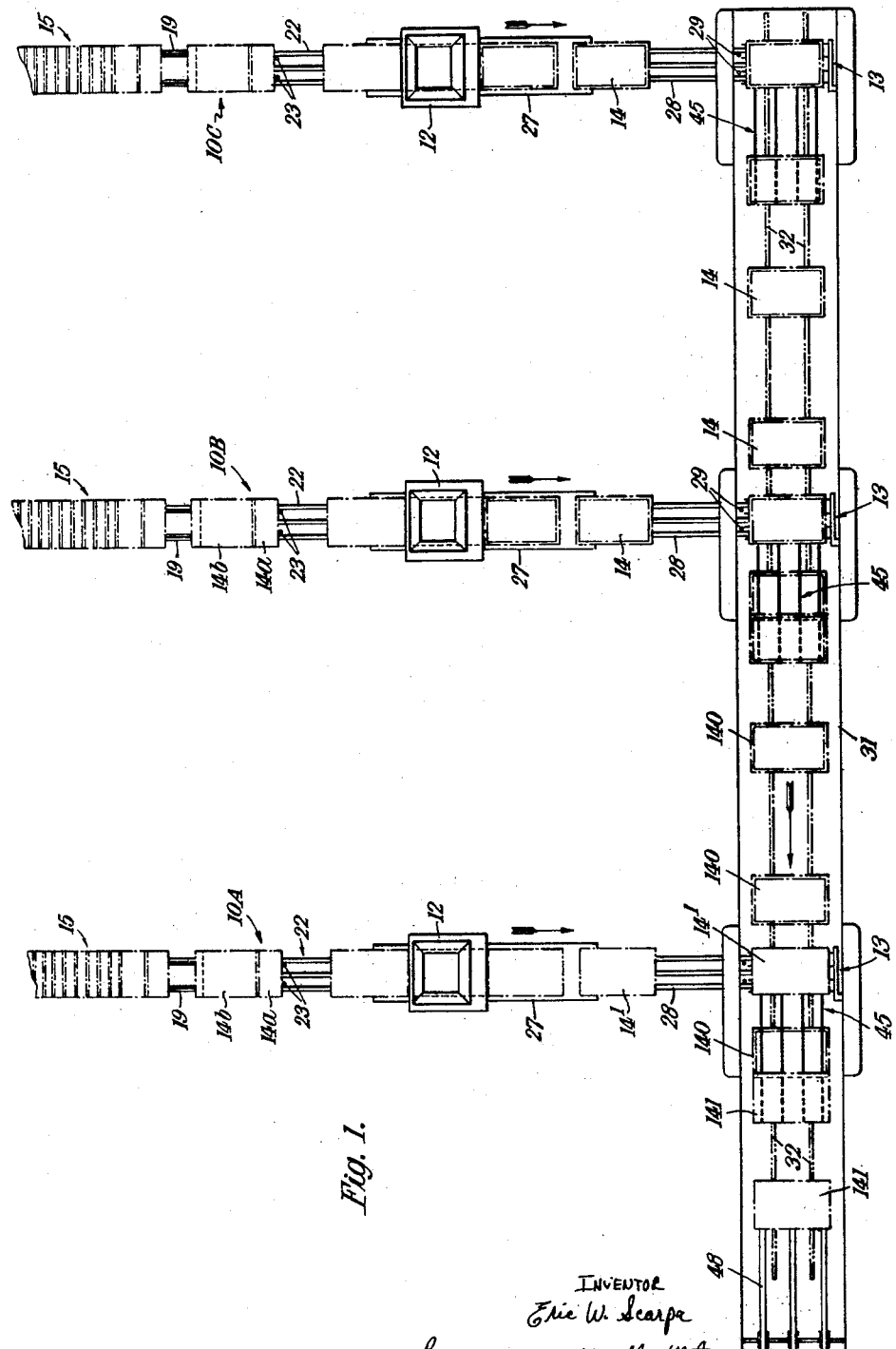
Figure 2:
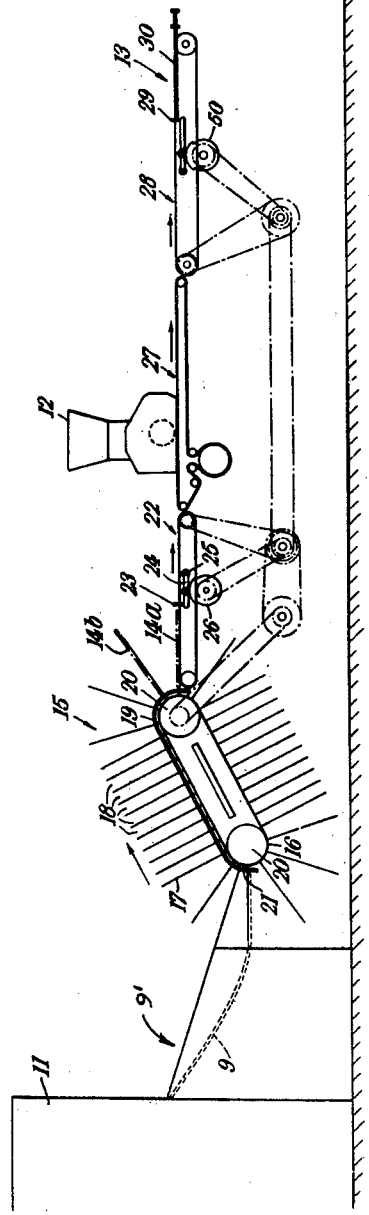
Figure 3:
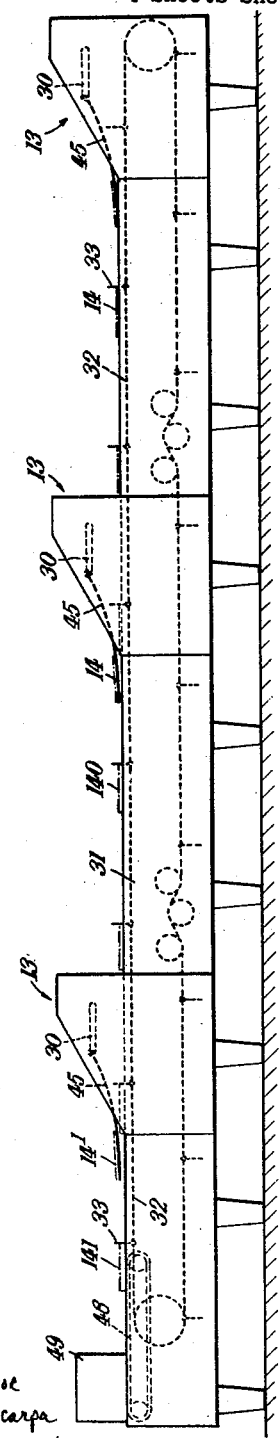
Figure 4:
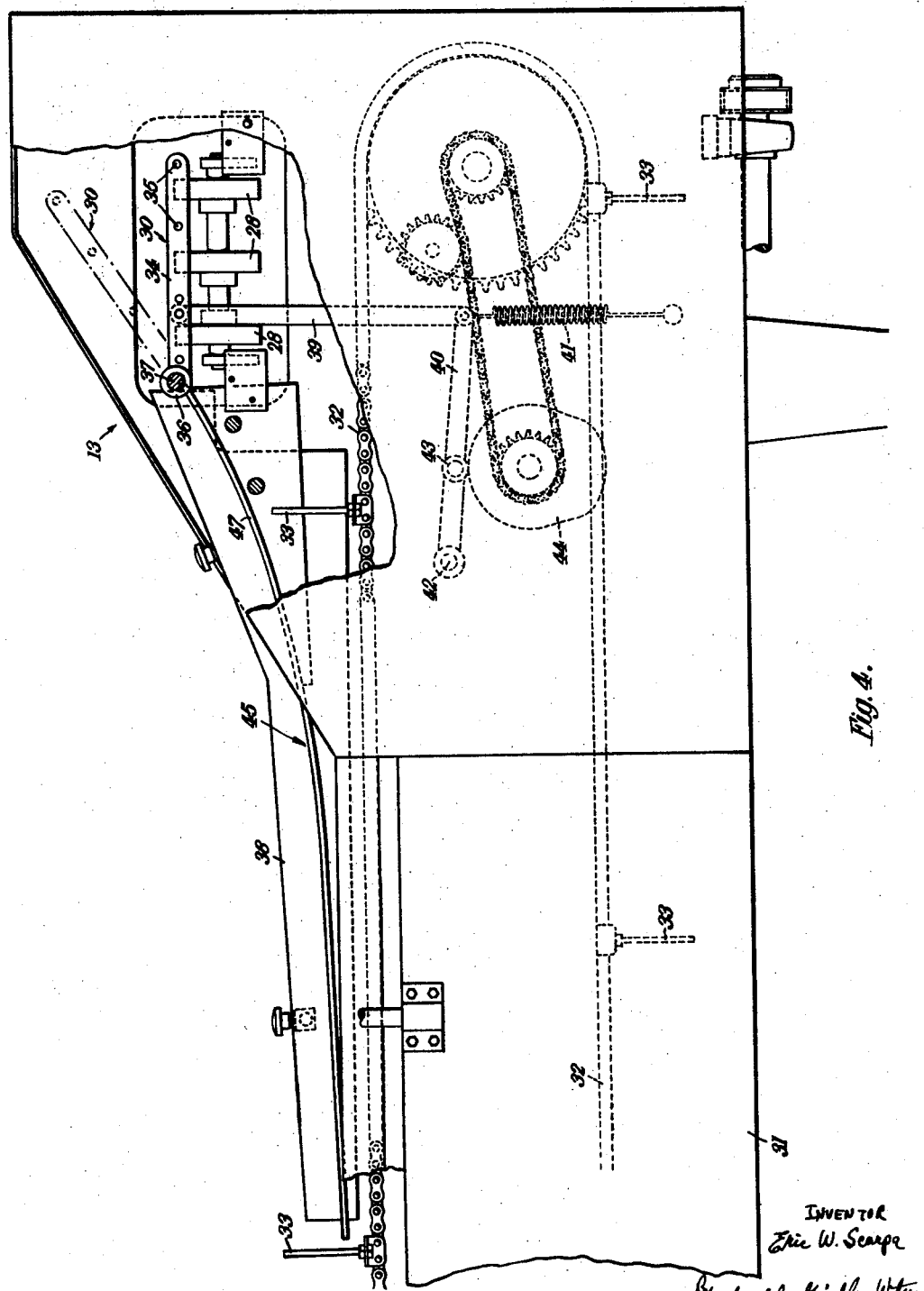

One embodiment of the invention will now be described in detail, by way of example, with reference to the accompanying drawings, in which:

FIG. 1 is a diagrammatic plan view of the apparatus,
FIG. 2 is a diagrammatic side elevation of one of the creaming conveyor systems,
FIG. 3 is a similar view of the sandwiching conveyor,
FIG. 4 is a side elevation, partly in section, of one of the depositers,
FIG. 5 is a corresponding end elevation and
FIG. 6 is a corresponding plan view.

As shown in FIG. 1, the apparatus includes three creaming conveyor systems 10A, 10B and 10C, each of which conveys wafers in succession from a known baking oven 11 (FIG. 2) beneath a conventional creamer 12 and to a depositor 13. The creamers 12 of the systems 10B and 10C deposit cream on the wafers passing beneath them, so that these systems deliver creamed wafers 14 to their respective depositors. The creamer 12 of the sysem 10A is rendered inoperative (or may be omitted altogether) so that this system delivers dry wafers 14′ to its depositor.

Each of the ovens 11, which may be of the construction described in British Patent No. 702,563, deliver wafers in succession down a chute 9′ to a cooling conveyor 15. Each chute 9′ is constituted by spaced rods 9 between which scrap material may fall. Each cooling conveyor 15 is constituted by a pair of parallel chains 16 carrying upstanding rods 17 which define pockets 18 for accommodating the wafers on edge. The spacing between the rods 9 is such as to permit the rods 17 to pass therebetween. The rods 17 on the top run of the conveyor, which is inclined upwardly from the chute 9′, pass through slots in a plate 19 the ends of which extend around the terminal drums 20 of the conveyor. The end 21 of the plate adjoining the chute constitutes a stop for the wafer sheets travelling down the chute and against which preceding wafers are caused to abut by subsequent wafers sliding down the incline of the rods 9.

The wafers are delivered by the cooling conveyor 15 to a conveyor 22 constituted by a series of parallel V belts that are spaced apart a distance sufficient to permit the rods 17 to pass therebetween. Associated with the conveyor 22 is a mechanically operated gate constituted by a forked member 23 lying in the space between adjacent belts of the conveyor and being mounted on a lever 24, which is supported on a pivot 25 and is periodically lowered by a cam 26 to allow wafers to pass. This gate determines the spacing of the wafers as they pass on to another more slowly moving band conveyor 27 on which they travel in abutment beneath the creamer 12. The creamed wafers then pass on to a faster V belt conveyor 28 having a number of spaced apart belts between which is a gate 29, similar to the gate 23 and operated by a cam 50 for determining the spacing at which the sheets are delivered to a depositing grid 30.

A wafer 14a is shown in FIGS. 1 and 2 on the conveyors 22, and the following wafer from the cooling conveyors is shown at 14b.

The sandwiching conveyor is constituted by a flight conveyor 31, which extends beneath all the grids in a direction at right angles to the conveyor systems 10A, 10B and 10C.

As shown most clearly in FIGS. 4–6, the conveyor 31 consists of a pair of chains 32 carrying upstanding flights 33 and is provided with side guides 38. Each grid consists of four rods 34 attached to two cross bars 35 having a common boss 36 which is pivotally mounted on a spindle 37. The grid is connected by a bar 39 (FIG. 4) to a lever 40, which is loaded by a spring 41 and is pivoted on a pin 42 and carries a follower 43 coacting with a cam 44 which operates to tilt the grid 30 periodically and allow the wafer resting on it to slide down a chute 45 to the flight conveyor 31. Each grid 13 includes stops 46 (FIG. 6) for arresting the wafers. Each chute 45 is constituted by spaced rods 47 and the flights 33 of the conveyor pass between these rods to rake the wafers from the chutes.

The depositor of the conveyor system 10C deposits creamed wafers 14 on to the flight conveyor which feeds these wafers forward at uniform spacing to the depositor of the conveyor system 10B. This depositor deposits a creamed wafer on top of each creamed wafer passing beneath it, so that two layer wafer sandwiches 140 are fed at regular intervals to the depositor of the conveyor system 10A. This depositor deposits a dry wafer on top of each two layer wafer sandwich to form a three layer sandwich 141. The sandwiches are thus built up progressively. Since the flights 33 bear against the trailing edges of the wafer sheets they are properly aligned longitudinally. The side guides 38 taper inwardly towards the discharge ends of the chutes 45 and ensure lateral alignment of the wafers and sandwiches.

A faster moving V belt conveyor 48 (FIG. 3) carries the completed sandwiches through a conventional pressure roll unit 49 which compresses them to ensure uniform adhesion of the cream and control of their thickness. The compressed sandwiches pass to a cutting unit (not shown) via a refrigerated cooler (also not shown).

All the conveyors, the creaming heads, the grids and the gates are operated from a common driving motor (not shown) to ensure synchronous operation.

What I claim as my invention and desire to secure by Letters Patent is:

1. An apparatus for the manufacture of wafer sandwiches comprising a plurality of conveyor systems which carry wafers in parallel paths, creamers associated with all but one of the conveyor systems, those of the conveyor systems which have creamers traversing the wafers in abutting relation beneath the creamers, sheet depositors at the ends of all the conveyor systems to which wafers are delivered in the same predetermined spaced relation by all the conveyor systems, and a flight conveyor extending at right angles to all of the conveyor systems beneath the depositors, all the depositors except the last one passed by the flight conveyor depositing creamed wafers in succession on the flight conveyor to form thereon piles of superposed creamed wafers and the last depositor depositing a dry wafer on top of each such pile.

2. Apparatus as claimed in claim 1, in which each depositor includes a grid, a chute and means operating in timed relation with the flight conveyor for periodically tilting the grid to allow a wafer to slide down the chute and onto the flight conveyor.

3. Apparatus as claimed in claim 2, in which each chute is constituted by spaced rods between which pass the flights of the flight conveyor.

4. Apparatus as claimed in claim 1, in which each conveyor system comprises a cooling conveyor on which wafers initially are assembled, a gate controlled conveyor for receiving the wafers from the cooling conveyor, a more slowly travelling conveyor on which the wafers travel in abutment and a faster gate controlled conveyor for passing the wafers from the more slowly travelling conveyor to the depositor.

5. Apparatus as claimed in claim 4, in which the cooling conveyor is constituted by a pair of parallel chains carrying upstanding rods defining pockets for accommodating the wafers on edge.

References Cited in the file of this patent

UNITED STATES PATENTS

| | | |
|---|---|---|
| 2,868,141 | Griner | Jan. 13, 1959 |
| 2,947,266 | Farrer | Aug. 2, 1960 |
| 2,973,725 | Farrer | Mar. 7, 1961 |